May 25, 1965 H. C. LIKEL 3,185,766

NETWORK REPEATER

Filed Aug. 11, 1960 3 Sheets-Sheet 1

INVENTOR.
H. C. LIKEL
BY
Eli Weiss
ATTORNEY

May 25, 1965 H. C. LIKEL 3,185,766

NETWORK REPEATER

Filed Aug. 11, 1960 3 Sheets-Sheet 2

INVENTOR.
H. C. LIKEL
BY
Eli Weiss
ATTORNEY

May 25, 1965 H. C. LIKEL 3,185,766

NETWORK REPEATER

Filed Aug. 11, 1960 3 Sheets-Sheet 3

INVENTOR.
H. C. LIKEL

BY Eli Weiss
ATTORNEY 3,185,766
Patented May 25, 1965

3,185,766

NETWORK REPEATER

Harry C. Likel, Brooklyn, N.Y., assignor to The Western Union Telegraph Company, New York, N.Y., a corporation of New York Filed Aug. 11, 1960, Ser. No. 49,090
13 Claims. (Cl. 178—70)

This invention relates generally to a network repeater and more particularly to a transistorized network repeater module having an improved mode of operation.

It is an object of this invention to provide a network repeater which is small in size, light in weight, reliable in operation, and economical to build.

It is another object of this invention to provide a network repeater which can be either inserted in or removed from a circuit containing many network repeaters without requiring circuit adjustments to maintain network stability.

It is still another object of this invention to provide a network repeater which will not require loop balancing procedures.

Figure 1A:
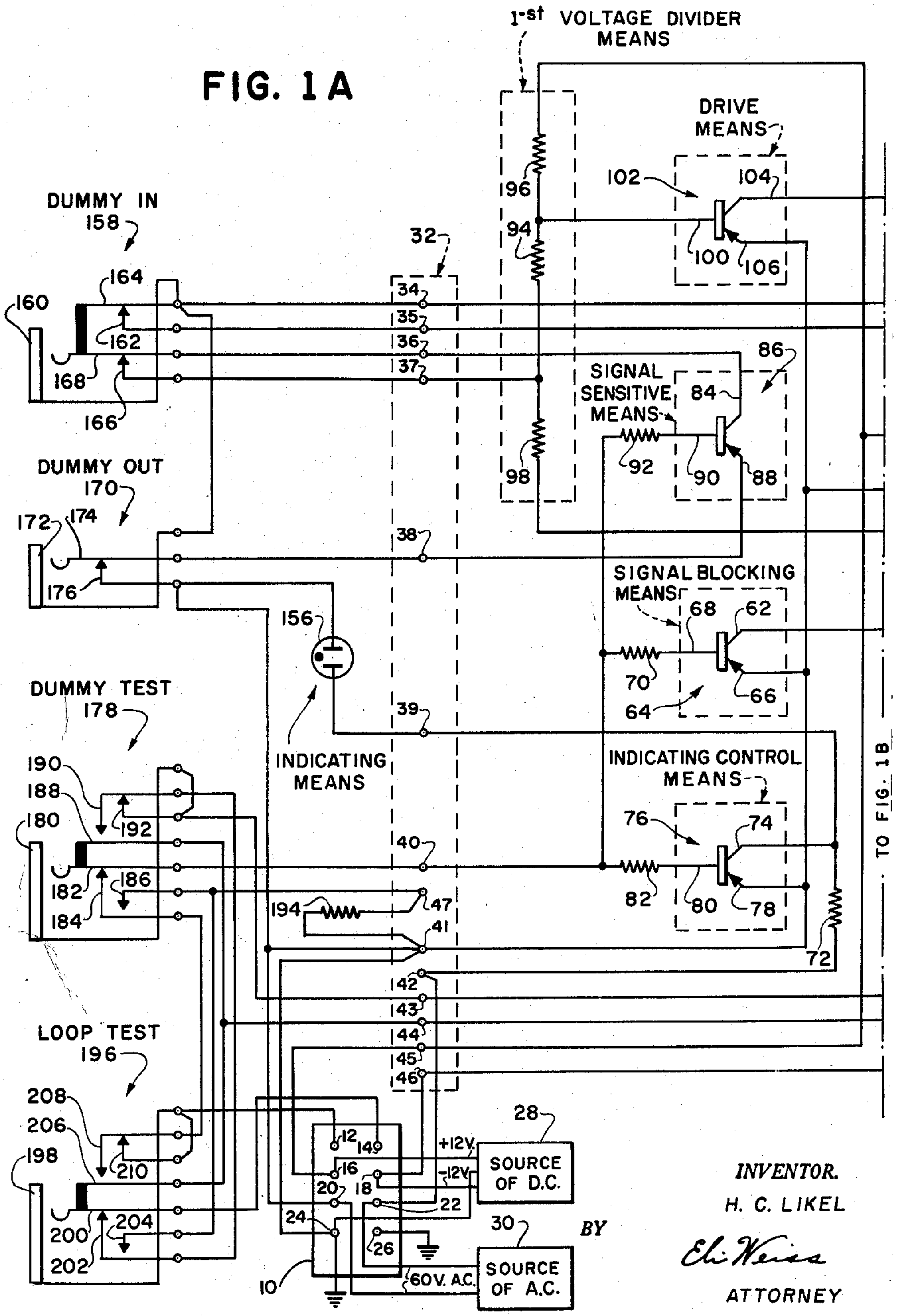
Figure 1B:
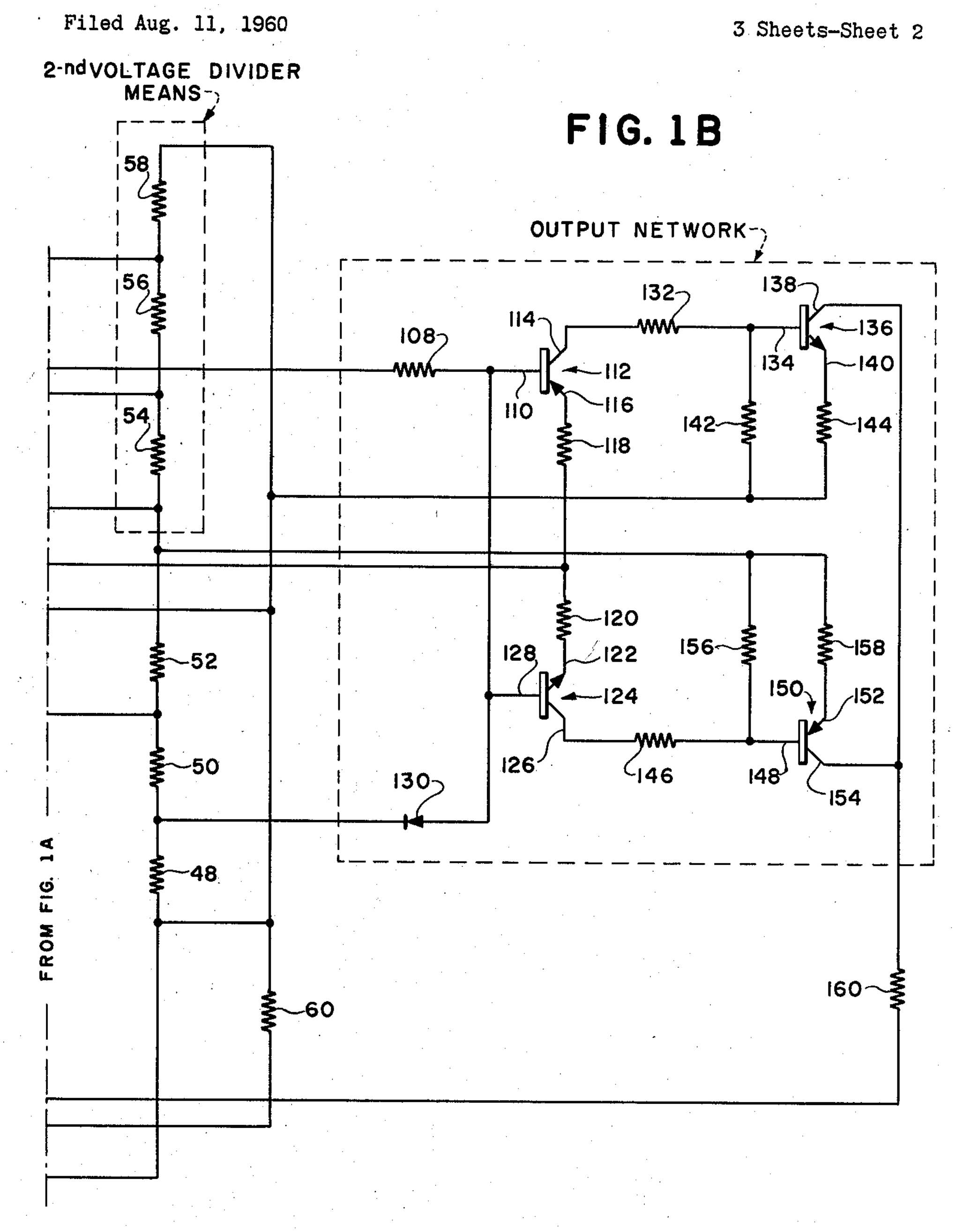
Figure 2:
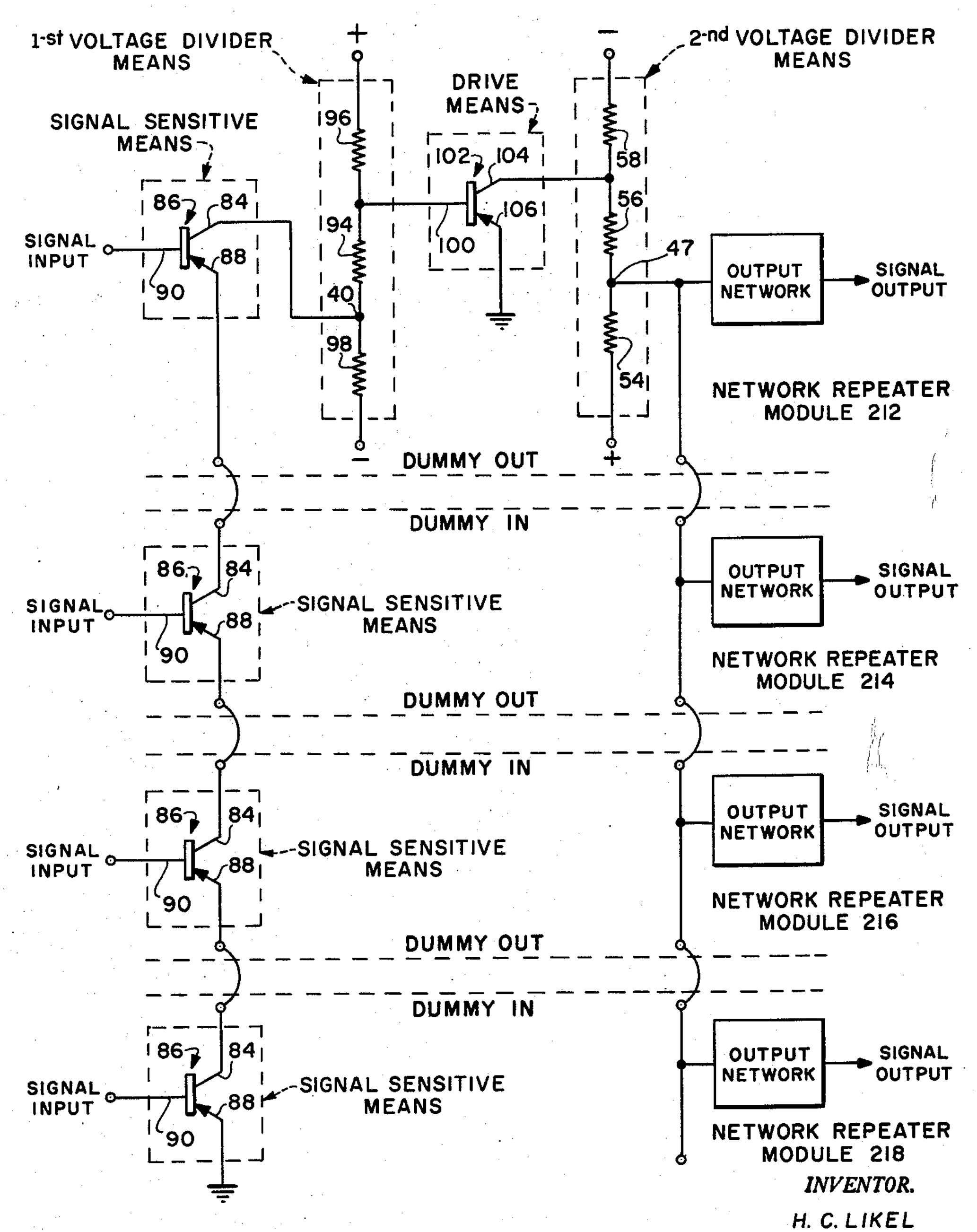

Other objects and many of the attendant advantages of this invention will be readily appreciated as the apparatus becomes better understood by reference to the following detailed description when considered in connection with the accompanying drawings wherein:

FIGS. 1A and 1B illustrate the structure of a module of a network repeater in accordance with the principles of this invention; and FIG. 2 illustrates in block form an installation utilizing four network repeater modules.

Similar reference characters refer to similar parts throughout the several views of the drawings.

With reference to FIGS. 1A and 1B a connector 10 supports eight terminals 12, 14, 16, 18, 20, 22, 24, 26. The signal fed to the network repeater module appears at terminal 14, and the signal fed from the network repeater module appears at terminal 12. A source of energy 28 which supplies a D.C. potential of twelve volts is coupled to feed a positive potential to terminal 16 and a negative potential to terminal 18; terminal 24 provides the neutral (ground) connection. A source of energy 30 which supplies an A.C. potential of sixty volts is coupled to feed the terminals 20, 22. Terminal 26 is connected to the chassis ground.

A terminal board 32 which supports the terminals 34, 35, 36, 37, 38, 39, 40, 41, 42, 43, 44, 45, 46, and 47 is provided to facilitate the electrical wiring of this invention.

Terminal 46 is coupled through resistors 48, 50, 52, 54, 56, 58, and 60, each connected in series with each other to terminal 44. Terminal 46 is also connected to the junction of the resistor 58 with resistor 60. The junction of the resistor 50 with resistor 52 is connected to the collector terminal 62 of a transistor 64 which supports an emitter terminal 66 and a base terminal 68. The emitter terminal 66 is connected to the terminal 41; and the base terminal 68 is coupled through a resistor 70 to the terminal 40. Terminal 39 is coupled through a resistor 72 to terminal 42, and also to the collector terminal 74 of a transistor 76 which supports an emitter terminal 78 and a base terminal 80. Emitter terminal 78 is coupled to terminal 41, and base terminal 80 is coupled through a resistor 82 to terminal 40.

Terminal 36 is connected to the collector 84 of a transistor 86 which supports an emitter terminal 88 and a base terminal 90. The emitter terminal 88 is connected to the terminal 38, and the base terminal 90 is coupled through a resistor 92 to terminal 40.

Terminal 37 is coupled through resistors 94 and 96, connected in series with each other, to terminal 45; and is also coupled through resistor 98 to the junction common to resistors 58 and 60. The junction of resistor 94 with resistor 96 is connected to the base terminal 100 of a transistor 102 which supports a collector terminal 104 and an emitter terminal 106. The emitter terminal 106 is connected to terminal 41, and the collector terminal 104 is connected to the junction of the resistor 56 with the resistor 58. Resistors 98, 94, and 96 function as a first voltage divider means; resistors 54, 56, and 58 function as a second voltage divider means.

Terminal 34 is coupled through a resistor 108 to the base terminal 110 of a transitsor 112 which supports a collector terminal 114 and an emitter terminal 116. The emitter terminal 116 is coupled through a resistor 118 to terminal 41, and through a second resistor 120 to the emitter terminal 122 of transistor 124 which supports a collector terminal 126 and a base terminal 128. The base terminal 128 is connected directly to base terminal 110, and coupled through a diode 130 to the junction of the resistor 48 with the resistor 50. The collector 114 is coupled through a resistor 132 to the base terminal 134 of a transistor 136 which supports a collector terminal 138 and an emitter terminal 140. The junction of the resistor 60 with the resistor 58 is coupled to the base terminal 134 through the resistor 142, and to the emitter terminal 140 through the resistor 144.

The collector terminal 126 of transistor 124 is coupled through a resistor 146 to the base terminal 148 of a transistor 150 which supports an emitter terminal 152 and a collector terminal 154.

The junction point of the resistor 52 with the resistor 54 is connected to terminal 45, and also to base terminal 148 of transistor 150 through a resistor 156, and to the emitter terminal 152 through a resistor 158.

Terminal 43 is coupled through a resistor 160 to collector terminal 154 of transistor 150 and to collector terminal 138 of transistor 136.

The transistor 102 functions as a drive means; transistor 64 functions as a signal blocking means; and the transistors 112, 124, 136, and 150 in combination with the input resistor 108 and the other associated resistors functions as an output network.

A glow discharge lamp 156 such as a neon lamp or the like is coupled between the terminals 39 and 41.

The glow discharge lamp 156 functions as an indicating means; and the transistor 76 functions as an indicating control means.

A jack 158 designated as a "dummy in" jack supports a sleeve contact 160, a stationary contact 162 which assumes a normally closed condition with a movable contact 164, and a stationary contact 166 which assumes a normally closed condition with a movable contact 168. The sleeve contact 160 is connected to the movable contact 164 and to the terminal 34. Stationary contact 162 is connected to terminal 35; movable contact 168 is connected to terminal 36, and stationary contact 166 is connected to terminal 37.

A second jack 170 designated as a "dummy out" jack supports a sleeve contact 172 and a movable contact 174 which assumes a normally closed condition with a stationary contact 176. The sleeve contact is connected to the terminal 34; the movable contact is connected to the terminal 38 and the stationary contact is connected to the terminal 41.

A third jack 178 designated as a "dummy test" jack supports a sleeve contact 180, a movable contact 182 which assumes a normally closed condition with an intermediate contact 184 which assumes a normally open condition with a stationary contact 186. Jack 178 also supports a movable contact 188 which assumes a normally open condition with an intermediate contact 190 which assumes a normally closed condition with a stationary contact 192. The sleeve contact 180 is connected to the stationary contact 192 and to the terminal 43. The movable contact 188 is connected to the terminal 44; movable contact 182 is connected to terminal 40; and stationary contact 186 is connected through a resistor 194 to terminal 41.

A fourth jack 196 designated as a "loop test" jack supports a sleeve contact 198, a movable contact 200 which assumes a normally closed condition with an intermediate contact 202 which assumes a normally open condition with a stationary contact 204. Jack 196 also supports a movable contact 206 which assumes a normally open condition with an intermediate contact 208 which assumes a normally closed condition with a stationary contact 210.

In operation, a plurality of network repeater modules are coupled together by means of plugs and cords. With reference to FIG. 2, the "dummy out" jack in the first appearing network repeater module 212 is coupled to the "dummy in" jack of the next appearing network repeater module 214; the "dummy out" jack of repeater module 214 is connected to the "dummy in" jack of repeater module 216; and the "dummy out" jack of repeater module 216 is connected to the "dummy in" jack of repeater module 218. The "dummy in" jack of the first or "head end" network repeater module 212 does not contain a plug; and the "dummy out" jack of the last network repeater module 218 does not contain a plug.

When a plurality of network repeater modules are being utilized, and are interconnected as just described (and illustrated in FIG. 2) the emitter terminal 88 of transistor 86 in the "head end" network repeater module 212 is connected through the "dummy out" jack of repeater module 212, and the "dummy in" jack of repeater module 214 to the collector terminal 84 of transistor 86 in the network repeater module 214. In a like manner, the emitter terminal 84 of transistor 86 in the network repeater module 214 is coupled to the collector terminal of transistor 86 in repeater module 216; and the emitter terminal 84 of transistor 86 in the network repeater 216 is coupled to the collector terminal of transistor 86 located in network repeater 218. The emitter terminal 88 of the transistor 86 located in the last positioned network repeater 218 is coupled to a ground terminal. However, in the "head end" or first network repeater 212 the collector terminal 84 of transistor 86 is coupled through the movable contact 168 and stationary contact 166 of jack 158 to terminal 37. Thus, in the four network repeater modules 212, 214, 216, 218 there is provided between terminal 37 and a ground terminal a series arrangement of transistors connected emitter to collector; emitter to collector; emitter to collector.

Now, when all patron's lines are on marking—a negative potential signal—then each base terminal of each transistor 86 in each of the repeater network modules 212, 214, 216, 218 is conductive, and a completed electrical path is established between terminal 37 and ground terminal (through the transistor 86). However, if a positive potential signal is fed to the base terminal 90 of transistor 86 associated with any one of the repeater network modules 212, 214, 216, 218 from the terminal 12 through the loop test jack and dummy test jack—then that transistor will become nonconductive, the electrical path between terminal 37 and ground will become discontinuous, and a negative potential will appear at terminal 37 and at junction 47—the extension of terminal 35 located physically at the junction of resistors 54 and 56.

Continuing (with respect to a single network repeater module 212 only), when a signal having a negative potential is fed to the base terminal 90 of transistor 86, that transistor will become conductive, the collector terminal 84 will assume a potential close to ground potential and, therefore, terminal 37 will assume a potential close to ground potential. Two resistors 94, 96, are interposed between terminal 37 and terminal 16 which is maintained at a positive potential by a source of D.C. 28. Now, since terminal 37 is essentially at ground level—the base terminal 100 of transistor 102 will be at a positive potential, and the transistor 102 will not be conductive. Two resistors 56, 58 interposed between terminal 47 and the negative potential terminal of the source of D.C., and one resistor 54 interposed between terminal 47 and the positive potential terminal of the source of D.C. comprises a voltage divider. Terminal 47 exhibits a negative potential when transistor 102 is in a nonconductive state.

The application of a positive potential signal to the base terminal 90 urges transistor 86 to assume a nonconducting state, and terminal 37 is no longer at ground potential—but assumes a negative potential. Resistors 96, 94 are positioned between the negative potential which appears on terminal 37 and a positive potential with resistor 96 on the positive side and resistors 94, 98 on the negative side to urge the base terminal 100 of transistor 102 to a negative condition which conditions transistor 102 to become conductive. The collector terminal 104 of transistor 102 now assumes a potential that is at or very close to ground potential, and terminal 47 exhibits a positive potential.

Thus, the polarity of the signal that appears at terminal 47 is the same as the polarity of the signal fed from any of the sending stations. The effect of the plug and cord connections to couple the network repeater modules 212, 214, 216, and 218 together is to connect the terminal 47 in the first or "head end" network repeater module to terminal 34 in each of the other network repeater modules.

Repeating—the "dummy" plug cords and jacks create a series path via the plug tips from ground terminal through the emittter terminal and collector terminal of each transistor 86 located in the network repeater modules 212, 214, 216, 218 to the voltage divider network composed of the resistors 96, 94, 98 located in the first network repeater module 212 only. Similarly, the "dummy" plug cords and jacks create a parallel path through the sleeve of each jack whereby each output network is connected through the input resistor 108 to the terminal 47 positioned in the first network repeater module 212. Now, in actual use, when all patron's lines are on marking (negative signal), all of the PNP transistors 86 are in a conductive state and ground is applied to terminal 37 (the junction of resistors 94, 98) in the "head end" repeater. A ground potential at terminal 37 raises the potential at the junction of the resistors 96, 94 to a positive value to urge transistor 102 to assume a nonconductive state.

Resistors 58, 56, and 54 form a voltage divider which maintains a negative potential signal at the terminal 47. This signal is fed to the resistor 108 of each network repeater module 212, 214, 216, 218.

A negative potential fed to resistor 108 urges the PNP transistor 112 to a conductive state, and the NPN transistor 124 to a nonconductive state. Now, transistor 136 is urged to a conductive state and, acting through its collector, emitter, emitter resistor and negative battery, feeds a negative potential signal through the jacks 178 and 196 to the terminal 14. When a spacing signal is received from a patron, the positive potential signal fed to the base terminal 90 of the transistor 86 in the associated network repeater is urged to a nonconductive state, and the series circuit from ground terminal to the voltage divider coupled to the base terminal 100 of transistor 102 becomes discontinuous. Removal of the ground terminal from the junction of resistors 94, 98 (terminal 37) urges the base terminal 100 to a negative state and transistor 102 becomes conductive and couples ground to the junction of resistors 56, 58 to raise the potential at the junction of resistors 56, 54 (terminal 47) to a positive value to reverse the polarity of the signal fed to the resistor 108, and the transistor 150 in each network repeater is urged to a conductive state and feeds a spacing signal through its collector, emitter, emitter resistor, and positive battery to the terminal 14.

Transistor 64 prevents a sending patron's network repeater from retransmitting a spacing signal back to the patron. Signals sent by a patron are fed simultaneously to the base terminals of transistors 86, 64, and 76 located within the patron's network repeater. Thus, a spacing signal fed to the base terminal 68 of transistor 64 will urge it to a conductive state to couple ground terminal 24 to the junction of resistors 50, 52 through its collector-emitter circuit. Now, voltage divider action lowers the potential at the junction of resistors 48, 50 to a negative value and the crystal diode 130 is biased to a conductive state, and a negative potential is maintained on the base terminals of the output transistors 112, 124 regardless of the signal fed through resistor 108.

Thus, transistor 64 conditions the output network in the network repeater module of the patron transmitting to prevent retransmission of the information. The limiting effect of resistor 108 limits this overriding effect to the user's network repeater module only.

Transistor 76 controls the operation of gas discharge lamp 156 to provide a visual indication that transmitted information is being received by the network repeater. Application of a normal marking signal to the base terminal 80 of transistor 76 urges transistor 76 to a conductive state to shunt the "line" 60 v. A.C. gas discharge lamp lead to ground terminal through resistor 72. However, since the other lead of the lamp is grounded permanently, the lamp will remain inoperative until a spacing signal urges transistor 72 to a nonconductive state to remove the ground shunt from the "live" A.C. lead. Thus, the lamp lights during the time that a spacing signal is transmitted by a patron.

The dummy test jack is utilized when it is desired to check the operation of the network repeater, and the loop test jack is utilized when it is desired to check the operation of the loop.

Obviously many modifications and variations of the present invention are possible in the light of the above teachings. It is, therefore, to be understood that within the scope of the appended claims the invention may be practiced otherwise than as specifically described.

I claim:

1. A module of a network repeater comprising a signal sensitive means sensitive to positive and negative polarity signals, a drive means driven selectively to an active or an inactive state by said signal sensitive means, an output network coupled to said drive means to pass a signal having a first polarity when said drive means is in an active state and a second polarity when said drive means is in an inactive state, and signal blocking means coupled to said signal sensitive means and said output network to inhibit selectively said output network from passing a positive signal.

2. A module of a network repeater comprising a first transistor sensitive to positive and negative polarity signals, a second transistor driven selectively to an active or an inactive state by said signal sensitive means, an output network coupled to said second transistor to pass a signal having a first polarity when said second transistor is in an active state and a second polarity when said second transistor is in an inactive state, and a third transistor coupled to said first transistor and said output network to inhibit selectively said output network from passing a positive signal.

3. A module of a network repeater comprising a first transistor sensitive to positive and negative polarity signals, a second transistor driven selectively to an active or an inactive state by said first transistor, an output network coupled to said second transistor to pass a signal having a first polarity when said second transistor is in an active state and a second polarity when said second transistor is in an inactive state, a gas discharge lamp, and a third transistor coupled to energize said gas discharge lamp when said first transistor senses a signal having a predetermined polarity to provide a visual indication that transmission is being received.

4. A module of a network repeater comprising a signal sensitive means sensitive to positive and negative polarity signals, a drive means driven selectively to an active or an inactive state by said signal sensitive means, an output network coupled to said drive means to pass a signal having a first polarity when said drive means is in an active state and a second polarity when said drive means is in an inactive state, signal blocking means interposed between sail signal sensitive means and said output network to inhibit selectively said drive means from passing a positive signal, indicating means, and indicating control means coupled to said signal sensitive means to energize said indicating means when said signal sensitive means senses a signal having positive polarity to provide a visual indication that transmission is being received.

5. A module of a network repeater comprising a signal sensitive means coupled to indicate the presence of a positive or negative signal by assuming an inactive or active state, a drive means, a first voltage divider means conditioned by said signal sensitive means to urge said drive means to an active or an inactive state, an output network, a second voltage divider means conditioned by said drive means to urge said output network to pass a signal having a first polarity when said drive means is in an active state and a second polarity when said drive means is in an inactive state, and signal blocking means, coupled to said signal sensitive means and said output network to inhibit selectively said output network from passing a positive signal.

6. A module of a network repeater comprising a signal sensitive means coupled to indicate the presence of a positive or negative signal by assuming an inactive or active state, a drive means, a first voltage divider means conditioned by said signal sensitve means to urge said drive means to an active or an inactive state, an output network, a second voltage divider means conditioned by said drive means to urge said output network to pass a signal having a first polarity when said drive means is in an active state and a second polarity when said drive means is in an inactive state, signal blocking means coupled to said signal sensitive means and said output network to inhibit selectively said output network from passing a positive signal, indicating means, and indicating control means coupled to said signal sensitive means to energize said indicating means when said signal sensitive means senses a signal having a positive polarity to provide a visual indication that transmission is being received.

7. A module of a network repeater comprising a first transistor coupled to indicate the presence of a positive or negative signal by assuming an inactive or active state, a second transistor, a first resistor network conditioned by said first transistor to urge said second transistor to an active or an inactive state, an output network, a second resistor network conditioned by said second transistor to urge said output network to pass a signal having a first polarity when said second transistor is in an active state and a second polarity when said second transistor is in an inactive state, a third transistor coupled to said first transistor and said output network to inhibit selectively said output network from passing a positive signal, a glow discharge lamp, and a fourth transistor coupled to said first transistor to energize said glow discharge lamp when said first transistor senses a signal having a positive polarity to provide a visual indication that transmission is being received.

8. A first and second module of a network repeater comprising a first signal sensitive means sensitive to positive or negative signals, a second signal sensitive means sensitive to positive or negative signals coupled in series with said first signal sensitive means, a drive means driven selectively to an active or an inactive state by said first or second signal sensitive means, a first output network coupled to said drive means to pass a signal having a first polarity when said drive means is in an active state and a second polarity when said drive means is in an inactive state, a second output network coupled to said drive means to pass a signal having a first polarity when said drive means is in an active state and a second polarity when said drive means is in an inactive state, a first signal blocking means interposed between said first signal sensitive means and said first output network to inhibit said first output network from passing a positive signal when a positive signal is fed to said first signal sensitive means, and a second signal blocking means interposed between said second signal sensitive means and said second output network to inhibit said second output network from passing a positive signal when a positive signal is fed to said second signal sensitive means.

9. A first and second module of a network repeater comprising a first signal sensitive means sensitive to positive or negative signals, a second signal sensitive means sensitive to positive or negative signals coupled in series with said first signal sensitive means, a drive means driven selectively to an active or an inactive state by said first or second signal sensitive means, a first output network coupled to said drive means to pass a signal having a first polarity when said drive means is in an active state and a second polarity when said drive means is in an inactive state, a second output network coupled to said drive means to pass a signal having a first polarity when said drive means is in an active state and a second polarity when said drive means is in an inactive state, a first signal blocking means interposed between said first signal sensitive means and said first output network to inhibit said first output network from passing a positive signal when a positive signal is fed to said first signal sensitive means, a second signal blocking means interposed between said second signal sensitive means and said second output network to inhibit said second output network from passing a positive signal when a positive signal is fed to said second signal sensitive means, first indicating means, first indicating control means coupled to said first signal sensitive means to energize said first indicating means when said first signal sensitive means senses a signal having a positive polarity to provide a visual indication that transmission is being received, second indicating means, and second indicating control means coupled to said second signal sensitive means to energize said second indicating means when said second signal sensitive means senses a signal having a positive polarity to provide a visual indication that transmission is being received.

10. A first and second module of a network repeater comprising a first signal sensitive means sensitive to positive or negative signals, a second signal sensitive means sensitive to positive or negative signals coupled in series with said first signal sensitive means, a drive means, a first voltage divider means conditioned by said first or second signal sensitive means to urge said drive means to an active or an inactive state, a first output network, a second output network, and a second voltage divider means conditioned by said drive means to urge said first and second output networks to pass a signal having a first polarity when said drive means is in an active state and a second polarity when said drive means is in an inactive state.

11. A first and second module of a network repeater comprising a first signal sensitive means sensitive to positive or negative signals, a second signal sensitive means sensitive to positive or negative signals coupled in series with said first signal sensitive means, a drive means, a first voltage divider means conditioned by said first or second signal sensitive means to urge said drive means to an active or an inactive state, a first output network, a second output network, a second voltage divider means conditioned by said drive means to urge said first and second output networks to pass a signal having a first polarity when said drive means is in an active state and a second polarity when said drive means is in an inactive state, first signal blocking means coupled to said first signal sensitive means and said first output network to inhibit said first output network from passing a positive signal when a positive signal is fed to said first signal sensitive means, and second signal blocking means interposed between said second signal sensitive means and said second output network to inhibit said second output network from passing a positive signal when a positive signal is fed to said second signal sensitive means.

12. A first and second module of a network repeater comprising a first signal sensitive means sensitive to positive or negative signals, a second signal sensitive means sensitive to positive or negative signals coupled in series with said first signal sensitive means, a drive means, a first voltage divider means conditioned by said first or second signal sensitive means to urge said drive means to an active or an inactive state, a first output network, a second output network, a second voltage divider means conditioned by said drive means to urge said first and second output networks to pass a signal having a first polarity when said drive means is in an active state and a second polarity when said drive means is in an inactive state, first signal blocking means coupled to said first signal sensitive means and said first output network to inhibit said first output network from passing a positive signal when a positive signal is fed to said first signal sensitive means, second signal blocking means interposed between said second signal sensitive means and said second output network to inhibit said second output network from passing a positive signal when a positive signal is fed to said second signal sensitive means, first indicating means, first indicating control means coupled to said first signal sensitive means to energize said first indicating means when said first signal sensitive means senses a signal having a positive polarity to provide a visual indication that transmission is being received, second indicating means, and second indicating control means coupled to said second signal sensitive means to energize said second indicating means when said second sensitive means senses a signal having a positive polarity to provide a visual indication that transmission is being received.

13. A first and second module of a network repeater comprising a first transistor sensitive to positive or negative signals, a second transistor sensitive to positive or negative signals coupled in series with said first transistor, a third transistor, a first resistor network conditioned by said first or second transistors to urge said third transistor to an active or an inactive state, a first output network, a second output network, a second resistor network conditioned by said third transistor to urge said first and second output networks to pass a signal having a first polarity when said third transistor is in an active state and a second polarity when said third transistor is in an inactive state, a fourth transistor coupled to said first transistor and said first output network to inhibit said first output network from passing a positive signal when a positive signal is fed to said first transistor, a fifth transistor interposed between said second transistor and said second output network to inhibit said second output network from passing a positive signal when a positive signal is fed to said second transistor, a first glow discharge lamp, a sixth transistor coupled to said first transistor to energize said first glow discharge lamp when said first transistor senses a signal having a positive polarity to provide a visual indication that transmission is being received, second glow discharge lamp, and seventh transistor coupled to said second transistor to energize said second glow discharge lamp when said second transistor senses a signal having a positive polarity to provide a visual indication that transmission is being received.

References Cited by the Examiner

UNITED STATES PATENTS 2,044,062 6/36 Cummings ---------------- 178—88

ROBERT H. ROSE, *Primary Examiner.*

NEWTON N. LOVEWELL, *Examiner.*